(12) United States Patent
Su et al.

(10) Patent No.: US 11,902,984 B2
(45) Date of Patent: Feb. 13, 2024

(54) METHOD FOR DETERMINING BUNDLING SIZE, USER EQUIPMENT AND NETWORK-SIDE DEVICE

(71) Applicant: CHINA ACADEMY OF TELECOMMUNICATIONS TECHNOLOGY, Beijing (CN)

(72) Inventors: Xin Su, Beijing (CN); Runhua Chen, Beijing (CN); Rakesh Tamrakar, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 53 days.

(21) Appl. No.: 16/759,599

(22) PCT Filed: Sep. 5, 2018

(86) PCT No.: PCT/CN2018/104087
§ 371 (c)(1),
(2) Date: Apr. 27, 2020

(87) PCT Pub. No.: WO2019/100808
PCT Pub. Date: May 31, 2019

(65) Prior Publication Data
US 2020/0288445 A1    Sep. 10, 2020

(30) Foreign Application Priority Data
Nov. 21, 2017    (CN) .......................... 201711167218.6

(51) Int. Cl.
*H04W 72/04*    (2023.01)
*H04W 72/23*    (2023.01)
*H04W 8/24*    (2009.01)

(52) U.S. Cl.
CPC ............. *H04W 72/23* (2023.01); *H04W 8/24* (2013.01)

(58) Field of Classification Search
CPC ... H04W 72/042; H04W 88/08; H04W 88/02; H04W 8/24; H04W 72/04; H04W 72/048;
(Continued)

(56) References Cited

U.S. PATENT DOCUMENTS

2011/0170498 A1* 7/2011 Liu ...................... H04W 72/563
370/329
2015/0078271 A1* 3/2015 Kim ........................ H04L 5/005
370/329
(Continued)

FOREIGN PATENT DOCUMENTS

CN          1946087 A      4/2007
CN       102714566 A3     10/2012
(Continued)

OTHER PUBLICATIONS

The State Intellectual Property Office of People's Republic of China, First Office Action, Application No. 201711167218.6, dated Jan. 6, 2020, Applicant: China Academy of Telecommunications Technology.
(Continued)

*Primary Examiner* — John D Blanton
(74) *Attorney, Agent, or Firm* — Harness, Dickey & Pierce, P.L.C.

(57) ABSTRACT

A method for determining a bundling size, user equipment and a network-side device are provided The method includes: reporting, by user equipment, capability information to a network-side device, where the capability information is used to indicate whether the user equipment supports one-physical resource block bundling, and receiving a bundling size set configured by the network-side
(Continued)

---

Reporting, by user equipment, capability information to a network-side device, and receiving, by the user equipment, a bundling size set configured by the network-side device for the user equipment according to the capability information — 401

Using, by the user equipment, a default bundling size or a bundling size configured via a higher-layer signaling to transmit data if the network-side device turns off a function of dynamic bundling size adjustment — 402 device for the user equipment according to the capability information, where supporting the one-physical resource block bundling indicates that a turn-off of a physical resource block bundling function is supported; and/or using, by the user equipment, a default bundling size or a bundling size configured via a higher-layer signaling to transmit data if the network-side device turns off a function of dynamic bundling size adjustment.

12 Claims, 4 Drawing Sheets

(58) Field of Classification Search
    CPC ........ H04W 72/23; H04L 1/00; H04L 5/0094;
              H04L 5/006; H04L 1/0006; H04L 1/0023;
                                                H04J 11/00
    See application file for complete search history.

(56) References Cited

U.S. PATENT DOCUMENTS

| 2016/0021642 | A1  |  1/2016 | Kim et al. |            |
|--------------|-----|---------|------------|------------|
| 2018/0145809 | A1* |  5/2018 | Kwak       | H04W 72/12 |
| 2018/0324760 | A1* | 11/2018 | Yuk        | H04L 5/0048 |
| 2019/0174323 | A1* |  6/2019 | Go         | H04L 43/16 |

FOREIGN PATENT DOCUMENTS

| CN | 102740484 A  | 10/2012 |
| CN | 103369468 A  | 10/2013 |
| CN | 107241126 A  | 10/2017 |
| WO | 2014137154 A3 | 11/2015 |

OTHER PUBLICATIONS

Patent Cooperation Treaty, Written Opinion and International Search Report, PCT/CN2018/104087, dated Jun. 4, 2020, China Academy of Telecommunications Technology.

3GPP TSG RAN WG1 NR Ad hoc #3, R1-1716879, Sep. 18-21, 2017, Nagoya, Japan, Agenda Item: 6.3.1.5, Source: vivo, Title: Summary of Issues on DL PRB bundling and Offline Agreement, Document For: Discussion.

The State Intellectual Property Office of People's Republic of China, Second Office Action, Application No. 201711167218.6, dated Jul. 3, 2020, Applicant: China Academy of Telecommunications Technology.

3GPP TSG RAN WG1 Meeting 90bis, R1-1717597, Oct. 9-13, 2017, Prague, CZ, Agenda Item: 7.2.1.4, Source: Samsung: Title: PRB bundling for NR DMRS, Document For: Discussion and Decision.

3GPP TSG RAN WG1 #90b, R1-1719072, Oct. 9-13, 2017, Prague, Czech, Agenda Item: 7.2.1.4, Source: vivo, Title: Summary of Offline Discussions on DL PRB Bundling, Document For: Discussion.

European Patent Office, Munich, Germany, Date: Nov. 20, 2020, Reference: 201124EPAG/KAG, Application No./Patent No. 18881466.9-1220 / 3691147 PCT/CN2018104087, Applicant/Proprietor: China Academy of Telecommunications Technology, Communication, Extended European Search Report.

3GPP TSG RAN WG1 Meeting NR#3, R1-1715434, Nagoya, Japan, Sep. 18-21, 2017, Source: ZTE, Sanechips, Title: On PRB Bundling, Agenda Item: 6.2.1.5, Document For: Discussion and Decision.

3GPP TSG RAN WG1 Meeting #91, R1-1720180, Reno, USA, Nov. 27-Dec. 1, 2017, Source: CATT, Title: PRB Bundling for DL Transmission, Agenda Item: 7.2.1.4, Document For: Discussion and Decision.

3GPP TSG-RAN WG1 #91, R1-1720740, Reno, USA, Nov. 27-Dec. 1, 2017, Source: Ericsson, Title: PRB Bundling for DL, Agenda Item: 7.2.1.4, Document For: Discussion and Decision.

Japanese Office Action dated Aug. 17, 2021 for Application No. JP 2020-526414.

Huawei, Hisilicon, "PRB bundling size for DL data precoding", Agenda Item 7.2.1.4, 3GPP TSG RAN WG1 Meeting #90bis, R1-1717297, Oct. 9-13, 2017, Prague, Czech Republic.

CATT, "PRB bundling for DP transmission", Agenda Item 7.2.1.4, 3GPP TSG RAN WG1 Meeting #90bis, R1-1717809, Oct. 9-13, 2017, Prague, Czech Rep.

Office Action issued by the European Patent Office dated Jan. 24, 2022 for Application No. 18 881 466.9.

\* cited by examiner

Fig.1

| Reporting, by user equipment, capability information to a network-side device, and receiving a bundling size set configured by the network-side device for the user equipment according to the capability information | ⟵ 201 |

Fig.2

Using, by the user equipment, a default bundling size or a bundling size configured via a higher-layer signaling to transmit data if the network-side device turns off a function of dynamic bundling size adjustment ⏤ 301

Fig.3

Reporting, by user equipment, capability information to a network-side device, and receiving, by the user equipment, a bundling size set configured by the network-side device for the user equipment according to the capability information ⏤ 401

Using, by the user equipment, a default bundling size or a bundling size configured via a higher-layer signaling to transmit data if the network-side device turns off a function of dynamic bundling size adjustment ⏤ 402

Fig.4

Receiving, by a network-side device, capability information reported by user equipment, and sending, by the network-side device, to the user equipment a bundling size set configured by the network-side device for the user equipment according to the capability information ⏤ 501

Configuring, by the network-side device, a bundling size configured for the user equipment via a higher-layer signaling if the network-side device turns off a function of dynamic bundling size adjustment ⏤ 502

METHOD FOR DETERMINING BUNDLING SIZE, USER EQUIPMENT AND NETWORK-SIDE DEVICE

CROSS-REFERENCE TO RELATED APPLICATION

This application is a U.S. national phase application of a PCT Application No. PCT/CN2018/104087 filed on Sep. 5, 2018, which claims a priority to Chinese Patent Application No. 201711167218.6, filed in China on Nov. 21, 2017, a disclosure of which is incorporated herein by reference in its entirety.

TECHNICAL FIELD

The present disclosure relates to the field of communication technology, and in particular to a method for determining a bundling size, user equipment (UE) and a network-side device.

BACKGROUND

In order to improve quality of channel estimation, physical resource block (PRB) bundling technology is introduced in communication systems. In the PRB bundling technology, it is required to keep a precoding mode unchanged in several consecutive PRBs. In this way, joint channel estimation among multiple PRBs may be used to improve accuracy of channel estimation. But how to determine a bundling size remains an issue to be solved.

SUMMARY

Embodiments of the present disclosure provide a method for determining a bundling size, user equipment and a network-side device, so as to solve a problem of how to determine the bundling size.

The present disclosure provides, in some embodiments, a method for determining a bundling size, and the method includes:
  reporting, by user equipment, capability information to a network-side device, wherein the capability information is used to indicate whether the user equipment supports one-PRB bundling, and receiving a bundling size set configured by the network-side device for the user equipment according to the capability information, wherein supporting the one-PRB bundling indicates that a turn-off of a PRB bundling function is supported; and/or
  using, by the user equipment, a default bundling size or a bundling size configured via a higher-layer signaling to transmit data if the network-side device turns off a function of dynamic bundling size adjustment.

Optionally, if the user equipment supports the one-PRB bundling, the bundling size set includes 1, and further includes one or more of: 2, 4, a consecutively scheduled bandwidth, and other value; or, if the user equipment does not support the one-PRB bundling, the bundling size set includes one or more of: 2, 4, a consecutively scheduled bandwidth, and other value except 1.

Optionally, the using, by the user equipment, the default bundling size or the bundling size configured via the higher-layer signaling to transmit data includes:
  using, by the user equipment, the default bundling size to transmit data; or
  using, by the user equipment, the bundling size configured by the network-side device via the higher-layer signaling to transmit data, wherein the bundling size is a bundling size in a bundling size set available to the user equipment; or
  using, by the user equipment, a minimum bundling size in a bundling size set available to the user equipment to transmit data.

Optionally, the bundling size set available to the user equipment includes: the bundling size set configured by the network-side device for the user equipment according to the capability information.

The present disclosure further provides, in some embodiments, a method for determining a bundling size, and the method includes:
  receiving, by a network-side device, capability information reported by user equipment, wherein the capability information is used to indicate whether the user equipment supports one-PRB bundling, and sending to the user equipment a bundling size set configured by the network-side device for the user equipment according to the capability information, wherein supporting the one-PRB bundling indicates that a turn-off of a PRB bundling function is supported; and/or
  configuring, by the network-side device, a bundling size for the user equipment via a higher-layer signaling if the network-side device turns off a function of dynamic bundling size adjustment.

Optionally, if the user equipment supports the one-PRB bundling, the bundling size set includes 1, and further includes one or more of: 2, 4, a consecutively scheduled bandwidth, and other value; or, if the user equipment does not support the one-PRB bundling, the bundling size set includes one or more of: 2, 4, a consecutively scheduled bandwidth, and other value except 1.

Optionally, the bundling size configured for the user equipment via the higher-layer signaling is a bundling size in a bundling size set available to the user equipment.

Optionally, the bundling size set available to the user equipment includes: the bundling size set configured by the network-side device for the user equipment according to the capability information.

The present disclosure further provides, in some embodiments, user equipment, and the user equipment includes:
  a transmission module, configured to report capability information to a network-side device, wherein the capability information is used to indicate whether the user equipment supports one-PRB bundling, and receive a bundling size set configured by the network-side device for the user equipment according to the capability information, wherein supporting the one-PRB bundling indicates that a turn-off of a PRB bundling function is supported; and/or
  a usage module, configured to use a default bundling size or a bundling size configured via a higher-layer signaling during data transmission of the user equipment if the network-side device turns off a function of dynamic bundling size adjustment.

Optionally, if the user equipment supports the one-PRB bundling, the bundling size set includes 1, and further includes one or more of: 2, 4, a consecutively scheduled bandwidth, and other value; or, if the user equipment does not support the one-PRB bundling, the bundling size set includes one or more of: 2, 4, a consecutively scheduled bandwidth, and other value except 1.

Optionally, the usage module is configured to use the default bundling size to transmit data if the network-side device turns off the function of dynamic bundling size adjustment; or, the usage module is configured to use the bundling size configured by the network-side device via the higher-layer signaling to transmit data if the network-side device turns off the function of dynamic bundling size adjustment, wherein the bundling size is a bundling size in a bundling size set available to the user equipment; or, the usage module is configured to use a minimum bundling size in a bundling size set available to the user equipment to transmit data if the network-side device turns off the function of dynamic bundling size adjustment.

The present disclosure further provides, in some embodiments, a network-side device, and the network-side device includes:
- a transmission module, configured to receive capability information reported by user equipment, wherein the capability information is used to indicate whether the user equipment supports one-PRB bundling, and send to the user equipment a bundling size set configured by the network-side device for the user equipment according to the capability information, wherein supporting the one-PRB bundling indicates that a turn-off of a PRB bundling function is supported; and/or
- a configuration module, configured to configure a bundling size for the user equipment via a higher-layer signaling if the network-side device turns off a function of dynamic bundling size adjustment.

Optionally, if the user equipment supports the one-PRB bundling, the bundling size set includes 1, and further includes one or more of: 2, 4, a consecutively scheduled bandwidth, and other value; or, if the user equipment does not support the one-PRB bundling, the bundling size set includes one or more of: 2, 4, a consecutively scheduled bandwidth, and other value except 1.

Optionally, the bundling size configured for the user equipment via the higher-layer signaling is a bundling size in a bundling size set available to the user equipment.

The present disclosure further provides, in some embodiments, user equipment, and the user equipment includes: a transceiver, a storage, a processor and a computer program stored in the storage and configured to be executed by the processor, wherein the transceiver is configured to report capability information to a network-side device, the capability information is used to indicate whether the user equipment supports one-PRB bundling, and receive a bundling size set configured by the network-side device for the user equipment according to the capability information, wherein supporting the one-PRB bundling indicates that a turn-off of a PRB bundling function is supported; and/or
use a default bundling size or a bundling size configured via a higher-layer signaling to transmit data if the network-side device turns off a function of dynamic bundling size adjustment.

Optionally, if the user equipment supports the one-PRB bundling, the bundling size set includes 1, and further includes one or more of: 2, 4, a consecutively scheduled bandwidth, and other value; or, if the user equipment does not support the one-PRB bundling, the bundling size set includes one or more of: 2, 4, a consecutively scheduled bandwidth, and other value except 1.

Optionally, the using the default bundling size or the bundling size configured via the higher-layer signaling to transmit data includes:
using the default bundling size to transmit data; or
using the bundling size configured by the network-side device via the higher-layer signaling to transmit data, wherein the bundling size is a bundling size in a bundling size set available to the user equipment; or
using a minimum bundling size in a bundling size set available to the user equipment to transmit data.

Optionally, the bundling size set available to the user equipment includes: the bundling size set configured by the network-side device for the user equipment according to the capability information.

The present disclosure further provides, in some embodiments, a network-side device, and the network-side device includes: a transceiver, a storage, a processor and a computer program stored in the storage and configured to be executed by the processor, wherein the transceiver is configured to receive capability information reported by user equipment, wherein the capability information is used to indicate whether the user equipment supports one-PRB bundling, and send to the user equipment a bundling size set configured by the network-side device for the user equipment according to the capability information, wherein supporting the one-PRB bundling indicates that a turn-off of a PRB bundling function is supported; and/or
configure a bundling size for the user equipment via a higher-layer signaling if the network-side device turns off a function of dynamic bundling size adjustment.

Optionally, if the user equipment supports the one-PRB bundling, the bundling size set includes 1, and further includes one or more of: 2, 4, a consecutively scheduled bandwidth, and other value; or, if the user equipment does not support the one-PRB bundling, the bundling size set includes one or more of: 2, 4, a consecutively scheduled bandwidth, and other value except 1.

Optionally, the bundling size configured for the user equipment via the higher-layer signaling is a bundling size in a bundling size set available to the user equipment.

Optionally, the bundling size set available to the user equipment includes: the bundling size set configured by the network-side device for the user equipment according to the capability information.

The present disclosure further provides, in some embodiments, a computer readable storage medium storing therein a computer program, wherein the program is configured to be executed by a processor to implement steps of the method for determining a bundling size on user equipment provided in the embodiments of the present disclosure.

The present disclosure further provides, in some embodiments, a computer readable storage medium storing therein a computer program, wherein the program is configured to be executed by a processor to implement steps of the method for determining a bundling size on a network-side device provided in the embodiments of the present disclosure.

In the embodiments of the present disclosure, the user equipment reports capability information to a network-side device, wherein the capability information is used to indicate whether the user equipment supports one-physical resource block PRB bundling, and receives a bundling size set configured by the network-side device for the user equipment according to the capability information, wherein supporting the one-PRB bundling indicates that a turn-off of a PRB bundling function is supported; and/or the user equipment uses a default bundling size or a bundling size configured via a higher-layer signaling to transmit data if the network-side device turns off the function of dynamic bundling size adjustment. Thus, the bundling size of the user equipment may be determined.

BRIEF DESCRIPTION OF THE DRAWINGS

In order to more clearly illustrate the technical solutions in embodiments of the present disclosure, the drawings used in the embodiments of the present disclosure will be briefly introduced below. Obviously, the drawings in the following description are only some embodiments of the present disclosure. Based on these drawings, other drawings may be obtained by those skilled in the art without any creative effort.

DETAILED DESCRIPTION

The technical solutions of embodiments of the present disclosure will be clearly and completely described below with reference to the drawings of embodiments of the present disclosure, apparently, the described embodiments are some embodiments of the present disclosure, but are not all the embodiments. Based on the embodiments of the present disclosure, all other embodiments derived by a person of ordinary skill in the art without any creative efforts shall fall within the scope of the present disclosure.

Figure 1:
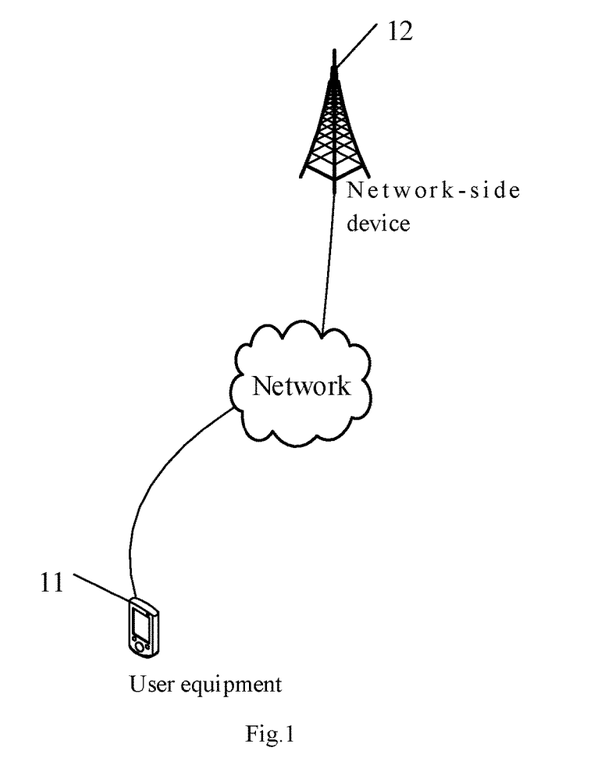
FIG. 1 is a schematic diagram of a network structure to which some embodiments of the present disclosure are applicable.

Referring to FIG. 1, FIG. 1 is a schematic diagram of a network structure to which some embodiments of the present disclosure are applicable. As shown in FIG. 1, user equipment (UE) 11 and a network-side device 12 are included. The user equipment 11 may be a UE-side device such as a mobile phone, a tablet personal computer, a laptop computer, a personal digital assistant (PDA), a mobile Internet device (MID), or a wearable device. It should be noted that a specific type of the user equipment 11 is not limited in embodiments of the present disclosure. The network-side device 12 may be a base station, such as, a macro station, an LTE eNB, or a 5G NR NB; the network-side device 12 may also be a small station, such as a low power node (LPN), a pico station, or a femto station, or the network-side device 12 may be an access point (AP); the base station may also be a network node composed of a central unit (CU) and a plurality of transmission reception points (TRP) managed and controlled by the CU. It should be noted that, a specific type of the network-side device 12 is not limited in the embodiments of the present disclosure.

Figure 2:
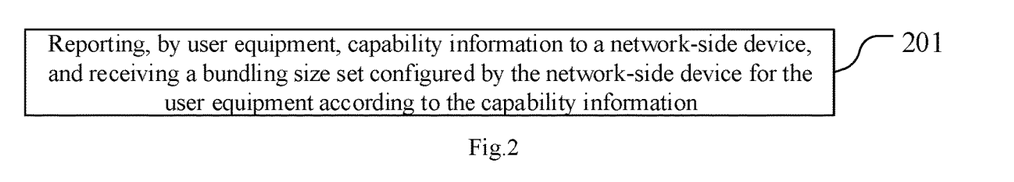
FIG. 2 is a flowchart of a method for determining a bundling size provided in some embodiments of the present disclosure.

Referring to FIG. 2, FIG. 2 is a flowchart of a method for determining a bundling size provided in some embodiments of the present disclosure. As shown in FIG. 2, the method includes the following steps.

Step 201, reporting, by user equipment, capability information to a network-side device, wherein the capability information is used to indicate whether the user equipment supports one-PRB bundling, and receiving a bundling size set configured by the network-side device for the user equipment according to the capability information, wherein supporting the one-PRB bundling indicates that a turn-off of a PRB bundling function is supported.

That supporting the one-PRB bundling indicates that a turn-off of a PRB bundling function is supported may be understood as: the user equipment supports not implementing a bundling of multiple PRBs, instead, the user equipment uses individual PRB for channel estimation separately, or the user equipment uses different precoding for different PRBs. Of course, if the user equipment supports a PRB bundling, the user equipment also supports a multi-PRB bundling, that is, the PRB bundling function is not turned off.

No support for the one-PRB bundling may be understood as: a turn-off of the PRB bundling function is not supported, then the user equipment does not support using individual PRB for channel estimation separately, or the user equipment only supports a bundling of multiple PRBs.

After receiving the capability information, the network-side device may configure different bundling size sets according to whether the user equipment supports the PRB bundling or not. The bundling size set may include multiple bundling sizes, to adapt to different communication scenarios, services, and so on.

In addition, after receiving the bundling size set, the user equipment may select a bundling size from the bundling size set for data transmission. For example, in a case that the network-side device turns off a function of dynamic bundling size adjustment, the user equipment autonomously selects a bundling size from the bundling size set for data transmission. Optionally, the user equipment receives indication information sent by the network-side device and selects a bundling size from the bundling size set according to the indication information for data transmission. For example, when the network-side device turns on the function of dynamic bundling size adjustment, the user equipment selects a bundling size from the bundling size set according to the indication information sent by the network-side device for data transmission;

In some embodiments of the present disclosure, the user equipment may support the one-PRB bundling through the above steps. As a result, for a time division duplexing (TDD) system, especially in a case that there are a large number of antennas and the channel frequency selectivity is obvious, a frequency-selective beamforming gain may be improved.

Optionally, if the user equipment supports the one-PRB bundling, the bundling size set includes 1, and further includes one or more of: 2, 4, a consecutively scheduled bandwidth, and other value.

The consecutively scheduled bandwidth may be a consecutive bandwidth on which the user equipment is scheduled, or may be a sum of consecutive bandwidths on which the user equipment are scheduled multiple times. The 1, 2, 4, and other value may represent one PRB, two PRBs, four PRBs, and other number of PRBs respectively, and the other value may be one or more integers other than 1, 2, and 4.

In this implementation, the user equipment may be configured with a bundling size set including 1, such as {1, 2, 4, a consecutively scheduled bandwidth}, or other value set including 1. In this way, the network-side device may dynamically configure a bundling size of 1 for the user equipment, and the user equipment performs one-PRB bundling; or the configured bundling size is multiple PRBs, and the user equipment performs a multi-PRB bundling. Alternatively, the user equipment may select a bundling size of 1 from the bundling size set, and the user equipment performs one-PRB bundling; or the bundling size selected by the user equipment is multiple PRBs, and the user equipment performs a multi-PRB bundling. For a TDD system, especially in a case that there are a large number of antennas and the channel frequency selectivity is obvious, the one-PRB bundling may improve a frequency-selective beamforming gain.

Optionally, if the user equipment does not support one-PRB bundling, the bundling size set includes one or more of: 2, 4, a consecutively scheduled bandwidth, and other value except 1.

In this implementation, the user equipment may be configured with a bundling size set that does not include 1, such as {2, 4, a consecutively scheduled bandwidth}, or other value set that does not include 1. In this way, the network-side device may dynamically configure a bundling size of multiple PRBs for the user equipment, and the user equipment performs a multi-PRB bundling; or the user equipment may select a bundling size of multiple PRBs from the bundling size set, and the user equipment performs a multi-PRB bundling. In this way, an error caused by configuring a bundling size of 1 for the user equipment not supporting the one-PRB bundling may be avoided.

Optionally, the method further includes:
 receiving, by the user equipment, DCI sent by the network-side device if the network side device turns on the function of dynamic bundling size adjustment, wherein the DCI includes a dynamic indication of the bundling size;
 determining, by the user equipment, a bundling size to be used in data transmission according to the dynamic indication of the bundling size.

The DCI may dynamically indicate the bundling size through 1 bit. For example, if a value of the bundling size dynamic indication bit included in the DCI is 1, the user equipment may select a bundling size from one or two values pre-configured via a higher-layer signaling. If there are two values corresponding to the case where bit=1, a specific bundling size is determined according to an implicit correspondence, such as a scheduled bandwidth and other parameters.

Alternatively, if the value of the bundling size dynamic indication bit included in the DCI is 0, the user equipment may use a bundling size pre-configured via a higher-layer signaling.

In this implementation, the bundling size may be dynamically configured for the user equipment.

It should be noted that a plurality of optional implementations described in the embodiments of the present disclosure may be implemented in combination with each other or separately, which is not limited in the embodiments of the present disclosure.

In the embodiment, the user equipment reports capability information to a network-side device, wherein the capability information is used to indicate whether the user equipment supports one-PRB bundling, and receives a bundling size set configured by the network-side device for the user equipment according to the capability information, wherein supporting the one-PRB bundling indicates that a turn-off of a PRB bundling function is supported. Thus, the bundling size of the user equipment may be determined.

Figure 3:
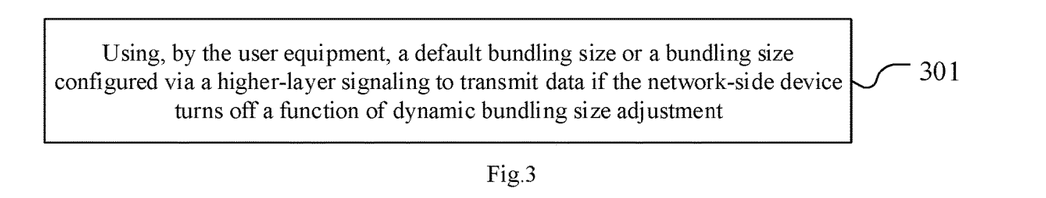
FIG. 3 is another flowchart of a method for determining a bundling size provided in some embodiments of the present disclosure.

Referring to FIG. 3, FIG. 3 is another flowchart of a method for determining a bundling size provided in some embodiments of the present disclosure. As shown in FIG. 3, the method includes the following steps.

Step 301, using, by the user equipment, a default bundling size or a bundling size configured via a higher-layer signaling to transmit data if the network-side device turns off a function of dynamic bundling size adjustment.

The turning off of the function of dynamic bundling size adjustment by the network-side device may be understood as: the network-side device turns off the function of dynamic bundling size adjustment, and notifies the user equipment. Turning off the function of dynamic bundling size adjustment may mean that the bundling size may not be adjusted dynamically. The turning off of the function of dynamic bundling size adjustment may be configured by the network-side device via a higher-level signaling, for example, the turning off of the function of dynamic bundling size adjustment is configured via a radio resource control (RRC) signaling.

The default bundling size may be a bundling size pre-configured by the user equipment or a bundling size pre-defined in a protocol. The bundling size configured via the higher-layer signaling may be a bundling size configured by the network-side device for the user equipment via a higher-layer signaling. For example, the bundling size may be a certain size in {1, 2, 4, a consecutively scheduled bandwidth}.

In some embodiments of the present disclosure, it may be implemented through the above steps that, if the function of dynamic bundling size adjustment is turned off, the bundling size may be obtained by default or through a higher-layer configuration, so as to prevent a situation that PRB bundling cannot be performed due to a failure in determining the bundling size when the function of dynamic bundling size adjustment is turned off.

Optionally, the using, by the user equipment, the default bundling size or the bundling size configured via the higher-layer signaling to transmit data includes:
 using, by the user equipment, the default bundling size to transmit data; or
 using, by the user equipment, the bundling size configured by the network-side device via the higher-layer signaling to transmit data, wherein the bundling size is a bundling size in a bundling size set available to the user equipment; or
 using, by the user equipment, a minimum bundling size in a bundling size set available to the user equipment to transmit data.

In this implementation, if the function of dynamic bundling size adjustment is turned off, the default bundling size may be selected, or the bundling size configured by the network-side device via a higher-level signaling may be used, or a minimum bundling size in the bundling size set available to the user equipment may be used by default, so as to improve flexibility of the system.

In addition, the bundling size set available to the user equipment may be the bundling size set configured by the network-side device for the user equipment according to the capability information of the user equipment. For the bundling size set, refer to the bundling size set in the embodiment shown in FIG. 2.

For example, if the user equipment supports the one-PRB bundling, the network-side device may configure a bundling size from among {1, 2, 4, a consecutively scheduled bandwidth} or other value set including 1 for the user equipment via a higher-level signaling. Optionally, if the user equipment does not support the one-PRB bundling, the network-side device may configure a bundling size from among {2, 4, a consecutively scheduled bandwidth} or other value set not including 1 for the user equipment via a higher-level signaling.

As another example, if the user equipment supports the one-PRB bundling, the user equipment may select a minimum value from {1, 2, 4, a consecutively scheduled bandwidth} or other value set including 1 as a bundling size. Optionally, if the user equipment does not support the one-PRB bundling, the user equipment may select a minimum value from {2, 4, a consecutively scheduled bandwidth} or other value set not including 1 as a bundling size.

It should be understood that, the bundling size set available to the user equipment is not limited to the bundling size set obtained through reporting capability information. For example, the bundling size set available to the user equipment may be pre-configured by the user equipment, or pre-configured by the network side device for the user equipment, and so on.

Optionally, the method further includes:
receiving, by the user equipment, DCI sent by the network-side device if the network side device turns on the function of dynamic bundling size adjustment, wherein the DCI includes a dynamic indication of the bundling size;
determining, by the user equipment, a bundling size to be used in data transmission according to the dynamic indication of the bundling size.

In this implementation, the bundling size may be dynamically configured for the user equipment.

In the embodiment, the user equipment uses a default bundling size or a bundling size configured via a higher-layer signaling to transmit data if the network-side device turns off the function of dynamic bundling size adjustment. Thus, the bundling size of the user equipment may be determined.

Figure 4:
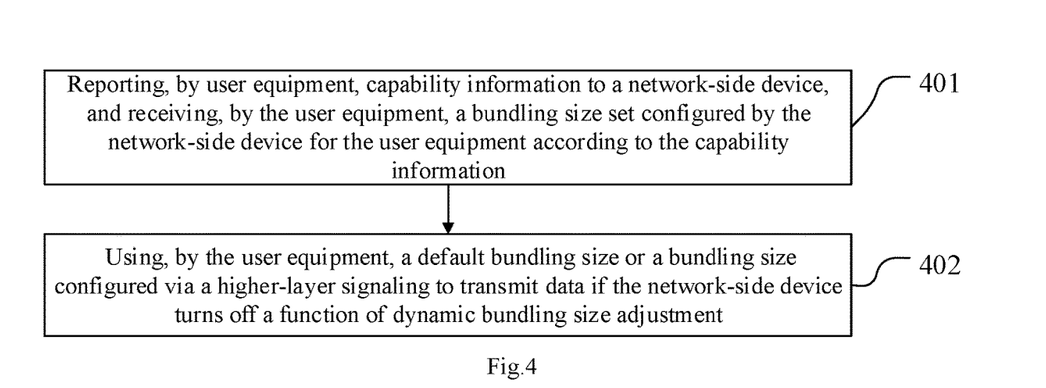
FIG. 4 is still another flowchart of a method for determining a bundling size provided in some embodiments of the present disclosure.

Referring to FIG. 4, FIG. 4 is yet another flowchart of a method for determining a bundling size provided in some embodiments of the present disclosure. As shown in FIG. 4, the method includes the following steps.

Step 401, reporting, by user equipment, capability information to a network-side device, wherein the capability information is used to indicate whether the user equipment supports one-PRB bundling, and receiving, by the user equipment, a bundling size set configured by the network-side device for the user equipment according to the capability information, wherein supporting the one-PRB bundling indicates that a turn-off of a PRB bundling function is supported;

Step 402, using, by the user equipment, a default bundling size or a bundling size configured via a higher-layer signaling to transmit data if the network-side device turns off a function of dynamic bundling size adjustment.

For descriptions of step 401 and step 402, reference may be made to the corresponding description of the embodiment shown in FIG. 2, details are not described here, and the same beneficial effects may be achieved.

It should be noted that, in some embodiments of the present disclosure, the execution order of step 401 and step 402 is not limited. Preferably, as shown in FIG. 4, step 401 is executed firstly, and then step 402 is executed.

Optionally, if the user equipment supports the one-PRB bundling, the bundling size set includes 1, and further includes one or more of: 2, 4, a consecutively scheduled bandwidth, and other value.

The consecutively scheduled bandwidth may be a consecutive bandwidth on which the user equipment is scheduled, or may be a sum of consecutive bandwidths on which the user equipment are scheduled multiple times. The 1, 2, 4, and other value may represent one PRB, two PRBs, four PRBs, and other number of PRBs respectively, and the other value may be one or more integers other than 1, 2, and 4.

In this implementation, the user equipment may be configured with a bundling size set including 1, so that the user equipment may perform the one-PRB bundling. For a TDD system, especially in a case that there are a large number of antennas and the channel frequency selectivity is obvious, the one-PRB bundling may improve a frequency-selective beamforming gain.

Optionally, if the user equipment does not support one-PRB bundling, the bundling size set includes one or more of: 2, 4, a consecutively scheduled bandwidth, and other value except 1.

In this implementation, the user equipment may be configured with a bundling size set that does not include 1. In this way, an error caused by configuring a bundling size of 1 for the user equipment not supporting the one-PRB bundling may be avoided.

Optionally, the using, by the user equipment, the default bundling size or the bundling size configured via the higher-layer signaling to transmit data includes:
using, by the user equipment, the default bundling size to transmit data; or
using, by the user equipment, the bundling size configured by the network-side device via the higher-layer signaling to transmit data, wherein the bundling size is a bundling size in a bundling size set available to the user equipment; or
using, by the user equipment, a minimum bundling size in a bundling size set available to the user equipment to transmit data.

In this implementation, if the function of dynamic bundling size adjustment is turned off, the default bundling size may be selected, or the bundling size configured by the network-side device via a higher-level signaling may be used, or a minimum bundling size in the bundling size set available to the user equipment may be used by default, so as to improve flexibility of the system.

In addition, the bundling size set available to the user equipment may be the bundling size set configured by the network-side device for the user equipment according to the capability information of the user equipment. For the bundling size set, refer to the bundling size set in step 401.

It should be understood that, the bundling size set available to the user equipment is not limited to the bundling size set obtained through reporting capability information. For example, the bundling size set available to the user equipment may be pre-configured by the user equipment, or pre-configured by the network side device for the user equipment, and so on.

Optionally, the method further includes:
receiving, by the user equipment, DCI sent by the network-side device if the network side device turns on the function of dynamic bundling size adjustment, wherein the DCI includes a dynamic indication of the bundling size;

determining, by the user equipment, a bundling size to be used in data transmission according to the dynamic indication of the bundling size.

In this implementation, the bundling size may be dynamically configured for the user equipment.

It should be noted that a plurality of optional implementations described in the embodiments of the present disclosure may be implemented in combination with each other or separately, which is not limited in the embodiments of the present disclosure.

In the embodiment, the user equipment reports capability information to a network-side device, wherein the capability information is used to indicate whether the user equipment supports one-PRB bundling, and receives a bundling size set configured by the network-side device for the user equipment according to the capability information, wherein supporting the one-PRB bundling indicates that a turn-off of a PRB bundling function is supported; the user equipment uses a default bundling size or a bundling size configured via a higher-layer signaling to transmit data if the network-side device turns off the function of dynamic bundling size adjustment. Thus, the bundling size of the user equipment may be determined.

Figure 5:
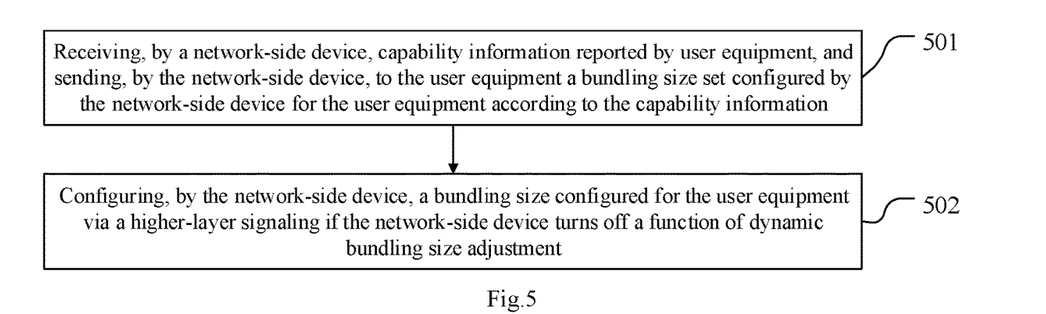
FIG. 5 is yet another flowchart of a method for determining a bundling size provided in some embodiments of the present disclosure.

Referring to FIG. 5, FIG. 5 is a flowchart of a method for determining a bundling size provided in some embodiments of the present disclosure. As shown in FIG. 5, the method includes:

step 501, receiving, by a network-side device, capability information reported by user equipment, wherein the capability information is used to indicate whether the user equipment supports one-PRB bundling, and sending, by the network-side device, to the user equipment a bundling size set configured by the network-side device for the user equipment according to the capability information, wherein supporting the one-PRB bundling indicates that a turn-off of a PRB bundling function is supported; and/or step 502, configuring, by the network-side device, a bundling size for the user equipment via a higher-layer signaling if the network-side device turns off a function of dynamic bundling size adjustment.

It should be noted that, the "and/or" between step 501 and step 502 may be understood as: the above method includes step 501 or step 502, or the above method may include step 501 and step 502. When step 501 and step 502 are included, in some embodiments of the present disclosure, the execution order of the two steps is not limited. Preferably, as shown in FIG. 5, step 501 is executed firstly, and then step 502 is executed.

Optionally, if the user equipment supports the one-PRB bundling, the bundling size set includes 1, and further includes one or more of: 2, 4, a consecutively scheduled bandwidth, and other value. Or, if the user equipment does not support the one-PRB bundling, the bundling size set includes one or more of: 2, 4, a consecutively scheduled bandwidth, and other value except 1.

Optionally, the bundling size configured for the user equipment via the higher-layer signaling is a bundling size in a bundling size set available to the user equipment.

Optionally, the bundling size set available to the user equipment includes: the bundling size set configured by the network-side device for the user equipment according to the capability information.

Optionally, the method further includes:

sending, by the network-side device, DCI to the user equipment if the network-side device turns on the function of dynamic bundling size adjustment, wherein the DCI includes a dynamic indication of the bundling size, so that the user equipment determines a bundling size to be used in data transmission according to the dynamic indication of the bundling size.

It should be noted that the present embodiment is an implementation of the network-side device corresponding to the embodiment shown in FIG. 2. For a specific implementation, refer to the related description of the embodiment shown in FIG. 2. In order to avoid repetitive description, details are not described in this embodiment, and the same beneficial effects may also be achieved.

Figure 6:
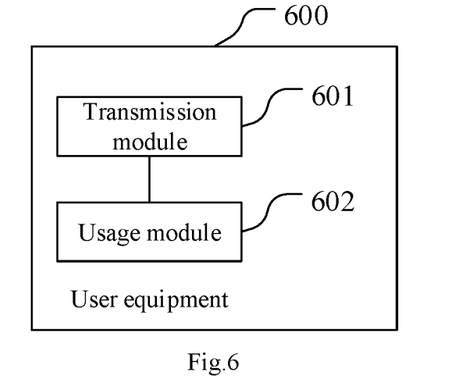
FIG. 6 is a structural diagram of user equipment provided in some embodiments of the present disclosure.

Referring to FIG. 6, FIG. 6 is a structural diagram of user equipment provided in some embodiments of the present disclosure. As shown in FIG. 6, the user equipment 600 includes:

a transmission module 601, configured to report capability information to a network-side device, wherein the capability information is used to indicate whether the user equipment supports one-PRB bundling, and receive a bundling size set configured by the network-side device for the user equipment according to the capability information, wherein supporting the one-PRB bundling indicates that a turn-off of a PRB bundling function is supported; and/or a usage module 602, configured to use a default bundling size or a bundling size configured via a higher-layer signaling to transmit data if the network-side device turns off a function of dynamic bundling size adjustment.

Optionally, if the user equipment supports the one-PRB bundling, the bundling size set includes 1, and further includes one or more of: 2, 4, a consecutively scheduled bandwidth, and other value. Or, if the user equipment does not support the one-PRB bundling, the bundling size set includes one or more of: 2, 4, a consecutively scheduled bandwidth, and other value except 1.

Optionally, the usage module 602 is configured to use the default bundling size to transmit data if the network-side device turns off the function of dynamic bundling size adjustment; or, the usage module 602 is configured to use the bundling size configured by the network-side device via the higher-layer signaling to transmit data if the network-side device turns off the function of dynamic bundling size adjustment, wherein the bundling size is a bundling size in a bundling size set available to the user equipment; or, the usage module 602 is configured to use a minimum bundling size in a bundling size set available to the user equipment to transmit data if the network-side device turns off the function of dynamic bundling size adjustment.

Optionally, the bundling size set available to the user equipment includes: the bundling size set configured by the network-side device for the user equipment according to the capability information.

Figure 7:
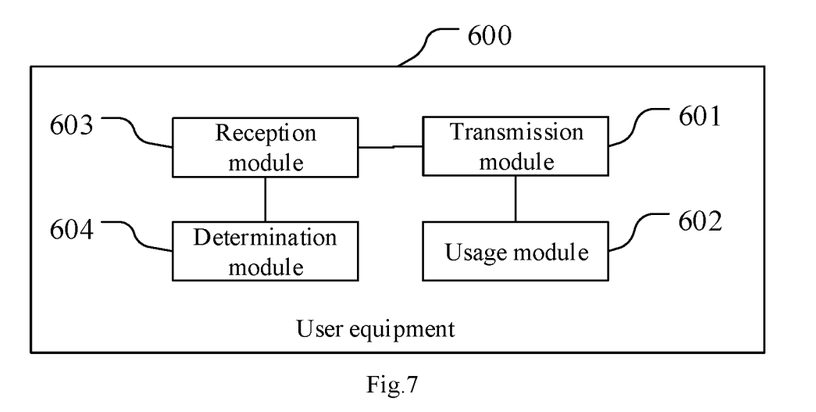
FIG. 7 is another structural diagram of user equipment provided in some embodiments of the present disclosure.

Optionally, as shown in FIG. 7, the user equipment 600 further includes:

a reception module 603, configured to receive, by the user equipment, downlink control information (DCI) sent by the network-side device if the network side device turns on the function of dynamic bundling size adjustment, wherein the DCI includes a dynamic indication of the bundling size;

a determination module 604, configured to determine a bundling size to be used in data transmission according to the dynamic indication of the bundling size.

It should be noted that the user equipment 600 in this embodiment may be user equipment in any of the method embodiments of the present disclosure, and any implementation of the user equipment in the method embodiments of the disclosure may be implemented by the user equipment 600 in this embodiment, and the same beneficial effects are achieved, which are not detailed herein again.

Figure 8:
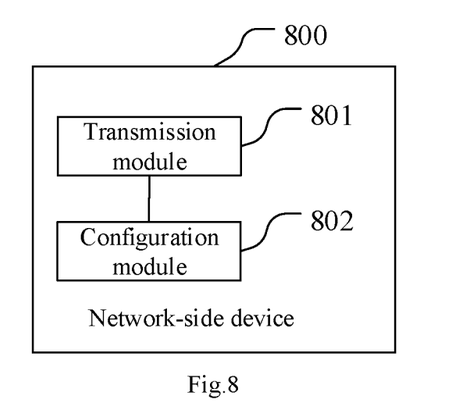
FIG. 8 is a structural diagram of a network-side device provided in some embodiments of the present disclosure.

Referring to FIG. 8, FIG. 8 is a structural diagram of a network-side device provided in some embodiments of the present disclosure. As shown in FIG. 8, the network-side device 800 includes:

a transmission module 801, configured to receive capability information reported by user equipment, wherein the capability information is used to indicate whether the user equipment supports one-PRB bundling, and send to the user equipment a bundling size set configured by the network-side device for the user equipment according to the capability information, wherein supporting the one-PRB bundling indicates that a turn-off of a PRB bundling function is supported; and/or a configuration module 802, configured to configure a bundling size for the user equipment via a higher-layer signaling if the network-side device turns off a function of dynamic bundling size adjustment.

Optionally, if the user equipment supports the one-PRB bundling, the bundling size set includes 1, and further includes one or more of: 2, 4, a consecutively scheduled bandwidth, and other value. Or, if the user equipment does not support the one-PRB bundling, the bundling size set includes one or more of: 2, 4, a consecutively scheduled bandwidth, and other value except 1.

Optionally, the bundling size configured for the user equipment via the higher-layer signaling is a bundling size in a bundling size set available to the user equipment.

Optionally, the bundling size set available to the user equipment includes: the bundling size set configured by the network-side device for the user equipment according to the capability information.

Figure 9:
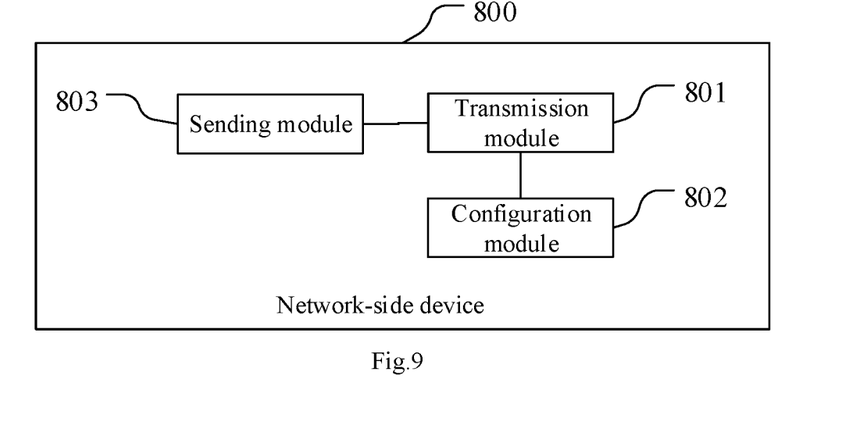
FIG. 9 is another structural diagram of a network-side device provided in some embodiments of the present disclosure.

Optionally, as shown in FIG. 9, the network-side device 800 further includes:

a sending module 803, configured to send DCI to the user equipment if the network-side device turns on the function of dynamic bundling size adjustment, wherein the DCI includes a dynamic indication of the bundling size, so that the user equipment determines a bundling size to be used in data transmission according to the dynamic indication of the bundling size.

It should be noted that the network-side device 800 in this embodiment may be a network-side device in any of the method embodiments of the disclosure, and any implementation of the network-side device in the method embodiments of the disclosure may be implemented by the network-side device 800 in this embodiment, and the same beneficial effects are achieved, which are not detailed herein again.

Figure 10:
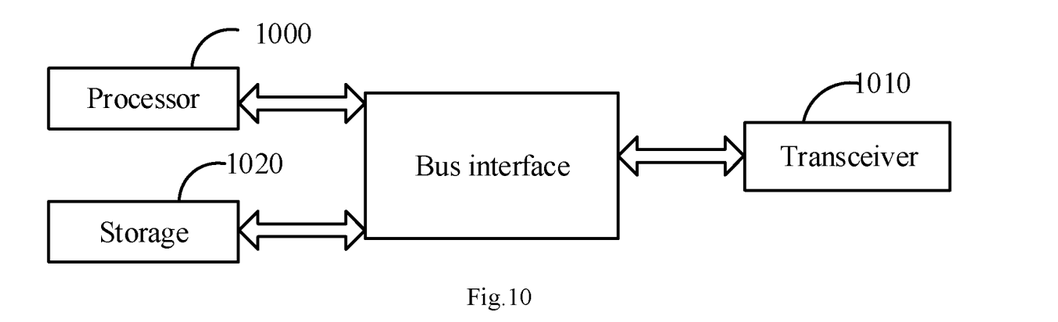
FIG. 10 is still another structural diagram of user equipment provided in some embodiments of the present disclosure.

Referring to FIG. 10, FIG. 10 is another structural diagram of user equipment according to some embodiments of the present disclosure. As shown in FIG. 10, the user equipment includes: a transceiver 1010, a storage 1020, a processor 1000, and a computer program stored in the storage 1020 and configured to be executed by the processor.

The transceiver 1010 is configured to report capability information to a network-side device, wherein the capability information is used to indicate whether the user equipment supports one-PRB bundling, and receive a bundling size set configured by the network-side device for the user equipment according to the capability information, wherein supporting the one-PRB bundling indicates that a turn-off of a PRB bundling function is supported; and/or use a default bundling size or a bundling size configured via a higher-layer signaling to transmit data if the network-side device turns off a function of dynamic bundling size adjustment.

The transceiver 1010 may be used to receive and send data under control of the processor 1000.

In FIG. 10, a bus architecture may include any number of interconnected buses and bridges. Various circuits, specifically, one or more processors represented by the processor 1000 and a storage represented by the storage 1020, are linked together. The bus architecture may also link various other circuits such as peripherals, voltage regulators and power management circuits, which are well known in the art, and therefore a further description is omitted herein. The bus interface provides interfaces. The transceiver 1010 may be a plurality of elements, that is, includes a transmitter and a receiver, to provide units configured to communicate with various other apparatuses over a transmission medium.

The processor 1000 is responsible for managing the bus architecture and general processing, and the storage 1020 may store data used by the processor 1000 when performing operations.

It should be noted that the storage 1020 is not limited to be located in the user equipment, instead, the storage 1020 and the processor 1000 may be located in different geographical locations separately.

Optionally, if the user equipment supports the one-PRB bundling, the bundling size set includes 1, and further includes one or more of: 2, 4, a consecutively scheduled bandwidth, and other value. Or, if the user equipment does not support the one-PRB bundling, the bundling size set includes one or more of: 2, 4, a consecutively scheduled bandwidth, and other value except 1.

Optionally, the using the default bundling size or the bundling size configured via the higher-layer signaling to transmit data includes:

using the default bundling size to transmit data; or using the bundling size configured by the network-side device via the higher-layer signaling to transmit data, wherein the bundling size is a bundling size in a bundling size set available to the user equipment; or using a minimum bundling size in a bundling size set available to the user equipment to transmit data.

Optionally, the bundling size set available to the user equipment includes: the bundling size set configured by the network-side device for the user equipment according to the capability information.

Optionally, the transceiver 1010 is further configured to: receive DCI sent by the network-side device if the network-side device turns on the function of dynamic bundling size adjustment, wherein the DCI includes a dynamic indication of the bundling size; and determine a bundling size to be used in data transmission according to the dynamic indication of the bundling size; or, the transceiver 1010 is further configured to receive downlink control information DCI sent by the network-side device if the network side device turns on the function of dynamic bundling size adjustment, wherein the DCI includes a dynamic indication of the bundling size.

The processor 1000 is configured to read the program in the storage 1020 and execute the following step:

determining a bundling size to be used in data transmission according to the dynamic indication of the bundling size.

It should be noted that the user equipment in this embodiment may be user equipment in any of the method embodiments of the present disclosure, and any implementation of the user equipment in the method embodiments of the present disclosure may be implemented by the user equipment in this embodiment, and the same beneficial effects are achieved, which are not described herein again.

Figure 11:
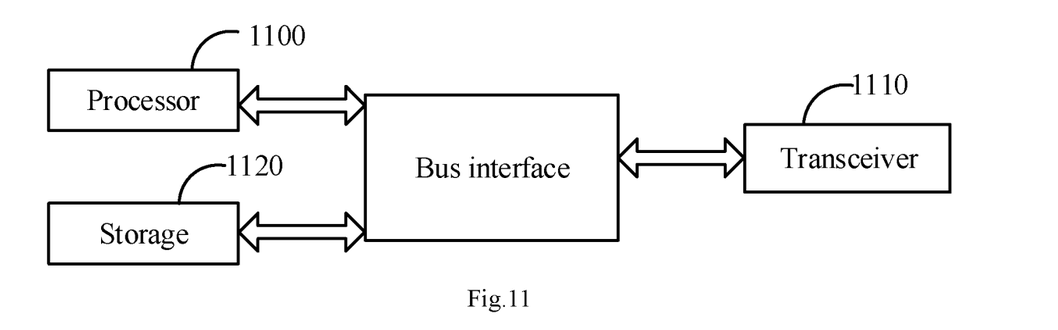
FIG. 11 is still another structural diagram of a network-side device provided in some embodiments of the present disclosure.

Referring to FIG. 11, FIG. 11 is another structural diagram of a network-side device according to some embodiments of the present disclosure. As shown in FIG. 11, the network-side device includes: a transceiver 1110, a storage 1120, a processor 1100, and a computer program stored in the storage 1120 and configured to be executed by the processor.

The transceiver 1110 is configured to receive capability information reported by user equipment, wherein the capability information is used to indicate whether the user equipment supports one-PRB bundling, and send to the user equipment a bundling size set configured by the network-side device for the user equipment according to the capability information, wherein supporting the one-PRB bundling indicates that a turn-off of a PRB bundling function is supported; and/or configure a bundling size for the user equipment via a higher-layer signaling if the network-side device turns off a function of dynamic bundling size adjustment.

The transceiver 1110 is configured to receive and send data under control of the processor 1100.

In FIG. 11, a bus architecture may include any number of interconnected buses and bridges. Various circuits, specifically, one or more processors represented by the processor 1100 and a storage represented by the storage 1120, are linked together. The bus architecture may also link various other circuits such as peripherals, voltage regulators and power management circuits, which are well known in the art, and therefore a further description is omitted herein. The bus interface provides interfaces. The transceiver 1110 may be a plurality of elements, that is, includes a transmitter and a receiver, to provide units configured to communicate with various other apparatuses over a transmission medium.

The processor 1100 is responsible for managing the bus architecture and general processing, and the storage 1120 can store data used by the processor 1100 when performing operations.

It should be noted that the storage 1120 is not limited to be located in a network-side device, instead, the storage 1120 and the processor 1100 may be located in different geographical locations separately.

Optionally, if the user equipment supports the one-PRB bundling, the bundling size set includes 1, and further includes one or more of: 2, 4, a consecutively scheduled bandwidth, and other value. Or, if the user equipment does not support the one-PRB bundling, the bundling size set includes one or more of: 2, 4, a consecutively scheduled bandwidth, and other value except 1.

Optionally, the bundling size configured for the user equipment via the higher-layer signaling is a bundling size in a bundling size set available to the user equipment.

Optionally, the bundling size set available to the user equipment includes: the bundling size set configured by the network-side device for the user equipment according to the capability information.

Optionally, the transceiver is further configured to send DCI to the user equipment if the network-side device turns on the function of dynamic bundling size adjustment, wherein the DCI includes a dynamic indication of the bundling size, so that the user equipment determines a bundling size to be used in data transmission according to the dynamic indication of the bundling size.

It should be noted that the network-side device in this embodiment may be a network-side device in any of the method embodiments of the present disclosure, and any implementation of the network-side device in the method embodiments of the present disclosure may be implemented by the network-side device in this embodiment, and the same beneficial effects are achieved, which are not detailed herein again.

The present disclosure further provides in some embodiments a computer readable storage medium storing therein a computer program, wherein the computer program is configured to be executed by a processor to implement steps of the method for determining a bundling size on user equipment provided in some embodiments of the present disclosure.

The present disclosure further provides in some embodiments a computer readable storage medium storing therein a computer program, wherein the computer program is configured to be executed by a processor to implement steps of the method for determining a bundling size on a network-side device provided in some embodiments of the present disclosure.

In some embodiments provided by the present application, it should be noted that, the disclosed method and device may be implemented in other manners. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

In addition, each functional units in various embodiments of the present disclosure may be integrated into one processing unit, or each unit may exist alone physically, or two or more units may be integrated into one unit. The integrated unit may be implemented in a form of hardware, or may also be implemented in a form of hardware plus a software functional unit.

The above integrated unit implemented in the form of a software functional unit may be stored in a computer readable storage medium. The above software functional unit is stored in a storage medium and includes several instructions so that a computer device (which may be a personal computer, a server, or a network device, etc.) to perform some steps of the method for determining a bundling size described in various embodiments of the present disclosure. The foregoing storage medium includes various media capable of storing program codes, such as a USB flash drive, a mobile hard disk, a read-only memory (ROM), a random access memory (RAM), a magnetic disk, or an optical disc.

The descriptions above are preferred embodiments of the disclosure, it should be noted that improvements and the embellishments may be made by those of ordinary skill in the art within the scope of the principle of the disclosure, and these improvements and the embellishments shall be construed as falling within the scope of the present disclosure.

What is claimed is:

1. A method for determining a bundling size, comprising:
using, by a user equipment, a default bundling size or a bundling size configured via a higher-layer signaling to transmit data, in case that dynamic adjustment of bundling size is disabled by a network-side device and downlink control information (DCI) signaling includes an indication that a bundling size is not received by the user equipment;

wherein the using, by the user equipment, the default bundling size or the bundling size configured via the higher-layer signaling to transmit data comprises:

using, by the user equipment, the default bundling size to transmit data; or using, by the user equipment, the bundling size configured by the network-side device via the higher-layer signaling to transmit data, wherein the bundling size is a bundling size in a bundling size set available to the user equipment;

wherein the default bundling size is a bundling size pre-configured by the user equipment;

wherein the bundling size set available to the user equipment comprises: a bundling size set configured by the network-side device for the user equipment according to capability information reported by the user equipment, the capability information being used to indicate whether the user equipment supports one-physical resource block (PRB) bundling.

2. The method according to claim 1, wherein, if the user equipment supports the one-PRB bundling, the bundling size set comprises 1, and further comprises one or more of: 2, 4, a consecutively scheduled bandwidth, and other value;

or, if the user equipment does not support the one-PRB bundling, the bundling size set comprises one or more of: 2, 4, a consecutively scheduled bandwidth, and other value except 1.

3. A method for determining a bundling size, comprising:

configuring, by a network-side device, a bundling size for a user equipment via a higher-layer signaling, in case that dynamic adjustment of bundling size is disabled by the network-side device and downlink control information (DCI) signaling includes an indication that a bundling size is not transmitted to the user equipment;

wherein the bundling size configured for the user equipment via the higher-layer signaling is a bundling size in a bundling size set available to the user equipment;

wherein the bundling size set available to the user equipment comprises:

a bundling size set configured by the network-side device for the user equipment according to capability information reported by the user equipment, the capability information being used to indicate whether the user equipment supports one-physical resource block (PRB) bundling.

4. The method according to claim 3, wherein, if the user equipment supports the one-PRB bundling, the bundling size set comprises 1, and further comprises one or more of: 2, 4, a consecutively scheduled bandwidth, and other value;

or, if the user equipment does not support the one-PRB bundling, the bundling size set comprises one or more of: 2, 4, a consecutively scheduled bandwidth, and other value except 1.

5. User equipment, comprising a transceiver, a storage, a processor and a computer program stored in the storage and configured to be executed by the processor, wherein the transceiver is configured to receive and send information under control of the processor, and the processor is configured to execute the computer program to control the transceiver to implement steps of the method for determining a bundling size according to claim 1.

6. The user equipment according to claim 5, wherein, if the user equipment supports the one-PRB bundling, the bundling size set comprises 1, and further comprises one or more of: 2, 4, a consecutively scheduled bandwidth, and other value;

or, if the user equipment does not support the one-PRB bundling, the bundling size set comprises one or more of: 2, 4, a consecutively scheduled bandwidth, and other value except 1.

7. The user equipment according to claim 5, wherein the bundling size set available to the user equipment comprises: the bundling size set configured by the network-side device for the user equipment according to the capability information.

8. A network-side device, comprising a transceiver, a storage, a processor and a computer program stored in the storage and configured to be executed by the processor, wherein the transceiver is configured to receive and send information under control of the processor, and the processor is configured to execute the computer program to control the transceiver to implement steps of the method for determining a bundling size according to claim 3.

9. The network-side device according to claim 8, wherein, if the user equipment supports the one-PRB bundling, the bundling size set comprises 1, and further comprises one or more of: 2, 4, a consecutively scheduled bandwidth, and other value;

or, if the user equipment does not support the one-PRB bundling, the bundling size set comprises one or more of: 2, 4, a consecutively scheduled bandwidth, and other value except 1.

10. The network-side device according to claim 8, wherein the bundling size set available to the user equipment comprises: the bundling size set configured by the network-side device for the user equipment according to the capability information.

11. A non-transitory computer readable storage medium storing therein a computer program, wherein the computer program is configured to be executed by a processor to implement steps of the method for determining a bundling size according to claim 1.

12. A non-transitory computer readable storage medium storing therein a computer program, wherein the computer program is configured to be executed by a processor to implement steps of the method for determining a bundling size according to claim 3.

* * * * *